United States Patent Office 3,073,820
Patented Jan. 15, 1963

---

3,073,820
2-PYRAZOLINYL-VINYL-1,3,3 TRIMETHYL INDOLENINES
Arnold F. Plue, Albany, N.Y.,
No Drawing. Filed Aug. 10, 1960, Ser. No. 48,567
6 Claims. (Cl. 260—240)

This invention relates to a new class of methine dyes which are brilliant in color and which dye synthetic fibers with good wash and light fastness.

While it is known that 1,3,3-trimethyl-2-methyleneindoline can be condensed with either a p-dialkylaminobenzaldehyde, p-(N-methyl-N-chloroethyl-amino)benzaldehyde, and various other dialkyl substituted aminobenzaldehydes to yield styryl dyes which generally possess sensitizing action, and as a consequence, can be employed in sensitizing silver halide emulsions, such dyes, however, have been employed to a limited extent only for dyeing synthetic fibers since most of them are poor in light and wash fastness.

I have found that by condensing 1,3,3 - trimethyl - 2-methyleneindoline with a 1-substituted-2-pyrazoline-3-carboxaldehyde in the presence of an acid condensing agent, a new class of methine dyes are obtained which are not only of high tinctorial strength and of good light and wash fastness, but also because of their brilliance are particularly adaptable for dyeing the currently available synthetic fibers such as "Acrilan," "Orlon 42," etc.

The new methine dyes are characterized by the following general formula:

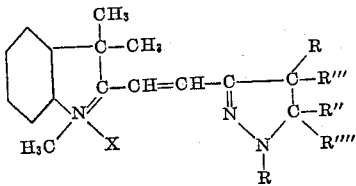

wherein R is selected from the class consisting of lower alkyl, i.e., methyl, ethyl, propyl, butyl, etc., phenyl or naphthyl. The alkyl, phenyl and naphthyl groups may be unsubstituted or substituted by inert groups such as, for example, lower alkoxy, e.g., methoxy, ethoxy, propoxy, butoxy, halogen, e.g., chloro or bromo, nitro, lower dialkylamino such as dimethyl and diethyl amino, cyano, sulfonamido, and mono- and di-substituted sulfonamido such as methyl-, ethyl-, morpholino-, and piperidino-, dimethyl- and diethyl-sulfonamido, and the like. R', R", R''' and R'''' are either hydrogen or lower alkyl, phenyl and naphthyl of the same value as in R.

The methine dyes of the present invention are readily obtained by condensing 1 mole or a slight excess thereof of 1,3,3-trimethyl-2-methyleneindoline with 1 mole or a slight excess of 1-substituted-2-pyrazoline-3-carboxaldehyde in the presence of an acidic condensing agent such as acetic acid, at a temperature ranging from 90–120° C. The time of reaction may range from ½ hour to 5 hours. After the reaction has been completed, the product is isolated by dilution with or drowning into water containing at least 1 molar equivalent of an anion, such as hydrochloric acid, sodium chloride, sulfuric acid, sodium sulfate, phosphoric acid, sodium phosphate, hydrogen iodide or sodium iodide, hydrobromic acid or sodium bromide, and the like. For example, if the product is to be isolated as the chloride the water used for isolation or drowning contains a slight excess over 1 mole of hydrochloric acid or excess over 1 mole of sodium chloride, or an excess containing both sodium chloride and hydrochloric acid. It is to be understood, however, that the product can also be precipitated in a similar manner as the iodide, bromide, sulfate, phosphate by employing the proper anion.

Alternatively, and especially when preparing relatively insoluble dye salts such as iodides, it has been found feasible to condense the 1.-substituted-2-pyrazoline-3-carboxaldehyde with a 1,2,3,3-tetramethyl-3H-pseudoindolium salt. This reaction is preferably carried out in a solvent medium, preferably in the presence of a small amount of base catalyst for ½ to 5 hours at a temperature of about 90–120° C.

The 1-substituted-2-pyrazoline-3-carboxaldehydes, which are condensed with the 1,3,3-trimethyl-2-methylene indoline, are characterized by the following general formula:

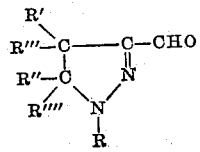

wherein R, R', R", R''' and R'''' have the same values as given above. The 1-substituted-2-pyrazolines are known compounds and prepared by different methods of synthesis. For example, Annalen 239, 194 (1887) shows the preparation of 1-phenyl-2-pyrazoline from phenyl hydrazine and acrolein. Berichte 41, 4232 (1908) shows the preparation of 1,5-diphenyl-2-pyrazoline from cinnamaldehyde phenyl hydrazone. Journal of the American Chemical Society 62, 2245 (1940) shows the preparation of 4-methyl-1-phenyl-2-pyrazoline from methacrolein and phenylhydrazine. Comptes rendus 180, 1759 shows the preparation of 5-ethyl-4-methyl-2-pyrazoline from β-ethylmethacrolein and hydrazine. Monatshefte 20, 849 shows a method of preparing 5-isopropyl-4-dimethyl-2-pyrazoline. U.S. Patent 2,727,900 shows the preparation of 5-methyl-5-trifluoromethyl-2-pyrazoline. These latter three products can be N-alkylated and -arylated in known manner to give 1-substituted-2-pyrazolines, or preferably, in the production of the 5-ethyl-4-methyl-2-pyrazoline, substitution of phenylhydrazine for hydrazine in the reaction with β-ethyl-methacrolein results in the production of 1-substituted-5-ethyl-4-methyl-2-pyrazoline directly. Numerous other suitable starting 1-substituted-2-pyrazolines are disclosed in the prior art as well as methods of prepartion corresponding to the methods described above and also other methods. It is apparent that different 1-substituted-2-pyrazolines of the type may be readily produced by varying the reactants, but still following the general methods of preparation described in the art.

The following table exemplifies some of the pyrazoline compounds which may be used as starting materials in the preparation of the 1-substituted-2-pyrazoline-3-carboxaldehydes as dye intermediates and the dyes resulting therefrom in accordance wtih the present invention. In this table, the R, R', R", R''' and R'''' substituents in the above formula, $C_6H_5$— and $C_6H_4$— signify phenyl radicals and $C_{10}H_7$— signifies a naphthyl radical.

STARTING COMPOUND

| | R | R' | R'' | R''' | R'''' |
|---|---|---|---|---|---|
| (1) | $CH_3-$ | H | H | H | H |
| (2) | $CH_3-$ | $CH_3-$ | H | H | H |
| (3) | $CH_3-$ | H | $CH_3-$ | H | H |
| (4) | $CH_3-$ | $CH_3-$ | $CH_3-$ | H | H |
| (5) | $CH_3-$ | $CH_3-$ | $C_2H_5-$ | H | H |
| (6) | $CH_3-$ | H | $C_6H_5-$ | H | H |
| (7) | $CH_3-$ | H | $C_{10}H_7-$ | H | H |
| (8) | $C_6H_5-$ | H | H | H | H |
| (9) | $C_6H_5-$ | H | $C_6H_5-$ | H | H |
| (10) | $C_6H_5-$ | $CH_3-$ | H | H | H |
| (11) | $ClC_2H_4-$ | H | $C_6H_5$ | H | H |
| (12) | $NCC_2H_4-$ | H | $C_6H_5$ | H | H |
| (13) | $(CH_3)_2NC_2H_4-$ | H | H | H | H |
| (14) | $C_6H_5-$ | H | $p-(CH_3)_2NC_6H_4-$ | H | H |
| (15) | $C_6H_5-$ | H | $p-CH_3OC_6H_4-$ | H | H |
| (16) | $C_6H_5-$ | H | $p-H_2NO_2SC_6H_4-$ | H | H |
| (17) | $C_6H_5-$ | H | $p-CH_3HNC_6H_4-$ | H | H |
| (18) | $C_6H_5-$ | H | $p-O\begin{smallmatrix}C_2H_4\\C_2H_4\end{smallmatrix}NO_2SC_6H_4-$ | H | H |
| (19) | $C_6H_5-$ | H | $p-H_2C\begin{smallmatrix}C_2H_4\\C_2H_4\end{smallmatrix}NO_2SC_6H_4-$ | H | H |
| (20) | $p-CH_3OC_6H_4-$ | H | $p-CH_3OC_6H_4-$ | H | H |
| (21) | $p-CH_3OC_6H_4-$ | H | $C_6H_5-$ | H | H |
| (22) | $p-(CH_3)_2NC_6H_4-$ | H | $C_6H_5-$ | H | H |
| (23) | $\beta-C_{10}H_7-$ | H | $C_6H_5-$ | H | H |
| (24) | $\beta-C_{10}H_7-$ | H | $p-CH_3OC_6H_4-$ | H | H |
| (25) | $p-(CH_3)_2NO_2SC_6H_4-$ | H | $C_6H_5-$ | H | H |
| (26) | $m-ClC_6H_4-$ | H | $C_6H_5-$ | H | H |
| (27) | $m-O_2NC_6H_4-$ | H | $C_6H_5-$ | H | H |
| (28) | $\alpha-C_{10}H_7-$ | H | $C_6H_5-$ | H | H |
| (29) | $C_6H_5-$ | $CH_3-$ | $C_6H_5-$ | H | H |
| (30) | $p-BrC_6H_4-$ | H | $C_6H_5-$ | H | H |
| (31) | $CH_3-$ | | $C_6H_5-$ | $CH_3-$ | H |
| (32) | $CH_3-$ | $CH_3-$ | $(CH_3)_2CH-$ | H | H |
| (33) | $CH_3-$ | $C_2H_5-$ | $C_2H_5-$ | H | H |
| (34) | $CH_3-$ | $CF_3-$ | $CF_3-$ | H | $CH_3-$ |
| (35) | $CH_3-$ | H | $CH_3-$ | H | $CF_3-$ |

In order to formylate the foregoing 1-substituted-2-pyrazolines, they are treated with a formylating agent such as formamide, methyl-, ethyl-, dimethyl- or diethyl-formamide, or formanilide, in the presence of an inorganic acid halide, such as phosphorus oxychloride or thionyl chloride.

In general the proportions of reactants employed are in the ratio of a mole of the starting pyrazoline compound, a molecularly equivalent amount to a slight excess up to about 10% excess of acyl halide, and a minimum of 1 mole up to about 10 moles of formylating agent. Excess formylating agent acts as a solvent and the viscosity of the reaction mixture may be varied according to the amount of formylating agent which is present. It is also desirable sometimes to carry out the reaction in the presence of an added solvent which is inert under the conditions of the reaction, such as benzene, toluene, xylene, carbon tetrachloride and the like.

The reaction is exothermic, and may be carried out by simply mixing the reactants and thereafter completing the reaction at elevated temperatures of about 90° to 110° C. However, I have found that the reaction runs more smoothly if the formylating agent and the acyl halide are combined at a temperature below 40° C. followed by slow addition with stirring of the pyrazoline compound at a temperature below 50° C., followed by heating at about 90° C. to 110° C. for from about ½ to 5 hours. The formylated product is then isolated, for example, by drowning and crystallizing from water. The crystalline product is filtered and washed with cold water. In order to further purify the product it may be recrystallized from suitable solvents, such as ethyl alcohol, isopropyl alcohol, benzene, benzene-ethyl alcohol mixtures and the like.

The resulting 1-substituted-2-pyrazoline-3-carboxaldehydes are useful as intermediates, particularly in the production of dyes and photographic sensitizers by reaction with 2-methylene-1,3,3-trimethyl-indoline in the presence of an acid condensing agent, as will be shown hereinafter.

The following examples will show first the preparation of the 1-substituted-2-pyrazoline-3-carboxaldehydes in which the parts are by weight unless otherwise indicated. It is to be clearly understood that these examples are merely illustrative and not to be construed as limitative of the invention claimed herein.

Example I

Preparation of 1-phenyl-2-pyrazoline-3-carboxaldehyde

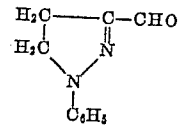

33.0 grams phosphorus oxychloride was added to 60.0 grams of dimethylformamide at a temperature of about 25° C. To this was added 22 grams of 1-phenyl-2-pyrazoline. The mixture was heated to 90–100° C. for ½ hour. It was poured into 1000 cc. cold water and allowed to stand several hours. It was filtered and the crystals washed with cold water. Recrystallization from ethanol yielded light yellow needles melting at 103–103.5° C. Another recrystallization from ether-petroleum ether mixture raised the melting point 103.5–104° C. A carbon, hydrogen and nitrogen analysis was in agreement with the constitution as shown in the formula.

Proof of structure of this compound was carried out as follows:

2.0 grams of the product was dissolved in 20 cc. diethylene triamine and 4.0 cc. hydrazine hydrate (85%) was then added. The mixture was warmed at 75–80° C. for ½ hour. 1 gram potassium hydroxide was added and the mixture was heated to 190° C. during a 2 hour period and held at 190–200° C. for ½ hour. The reaction mixture was cooled and diluted with 5–6 parts cold water. The crude product was filtered and recrystallized, first from ethanol, and then from ether-petroleum ether mixture. The product has a melting point of 75–76° C., and is identical with 3-methyl-1-phenyl-2-pyrazoline obtained by reacting phenyl hydrazine with methyl vinyl ketone.

Example II

Preparation of 1,5-diphenyl-2-pyrazoline-3-carbaxaldehyde

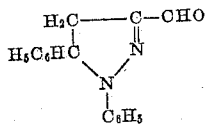

22.0 grams of phosphorus oxychloride was added to 40.0 grams of dimethylformamide at a temperature of about 25° C. To this was added 22 grams of 1,5-diphenyl-2-pyrazoline. The mixture was heated to 90–100° C. for ¾ hour. It was poured into 500 cc. cold water and allowed to stand for several hours. The crude product was filtered and washed with cold water, then recrystallized, first from ethanol, and then from ether-petroleum ether mixture. The melting point of the product was 99–100° C. A carbon, hydrogen and nitrogen analysis was in agreement with the constitution as shown in the formula.

Proof of structure of this compound was carried out as follows:

2.0 grams of the product was reduced in the same manner as in Example I. This product, which had a melting point of 115–115.5° C., was identical with that obtained by reaction of phenyl hydrazine with benzal acetone.

Example III

Preparation of 5-phenyl-1-p-tolyl-2-pyrazoline-3-carboxaldehyde

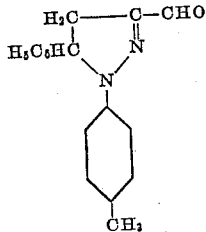

22.0 grams phosphorus oxychloride was added to 40.0 grams of dimethylformamide at a temperature of about 25° C. To this was added 24 grams of 5-phenyl-1-p-tolyl-2-pyrazoline. The mixture was heated to 90–100° C. for 1 hour. It was then poured into 500 cc. cold water and allowed to stand for several hours. The crude product was filtered and washed with cold water, then recrystallized, first from ethanol and then from ether-petroleum ether mixture. The melting point of the product was 88–89° C. A carbon, hydrogen and nitrogen analysis was in agreement with the constitution as shown in the formula.

Proof of structure of this compound was carried out as follows:

2.0 grams of the product was reduced in the same manner as in Example I. This product, which had a melting point of 79–80° C. was identical with a product prepared by reacting p-tolyl-hydrazine with benzal acetone.

In addition to the foregoing examples, the following 1-substituted-2-pyrazoline-3-carboxaldehydes were also prepared:

(1) 1-methyl-2-pyrazoline-3-carboxaldehyde
(2) 1,4-dimethyl-2-pyrazoline-3-carboxaldehyde
(3) 1,5-dimethyl-2-pyrazoline-3-carboxaldehyde
(4) 1,4,5-trimethyl-2-pyrazoline-3-carboxaldehyde
(5) 1,4-dimethyl-5-ethyl-2-pyrazoline-3-carboxaldehyde
(6) 1-methyl-5-phenyl-2-pyrazoline-3-carboxaldehyde
(7) 1-methyl-5-naphthyl-2-pyrazoline-3-carboxaldehyde
(8) 1-phenyl-2-pyrazoline-3-carboxaldehyde
(9) 1,5-diphenyl-2-pyrazoline-3-carboxaldehyde
(10) 4-methyl-1-phenyl-2-pyrazoline-3-carboxaldehyde
(11) 1-chloroethyl-5-phenyl-2-pyrazoline-3-carboxaldehyde
(12) 1-cyanoethyl-5-phenyl-2-pyrazoline-3-carboxaldehyde
(13) 1-(dimethylaminoethyl)-2-pyrazoline-3-carboxaldehyde
(14) 5-(p-dimethylaminophenyl)-1-phenyl-2-pyrazoline-3-carboxaldehyde
(15) 5-(p-anisyl)-1-phenyl-2-pyrazoline-3-carboxaldehyde
(16) 1-phenyl-5-(p-sulfamylphenyl)-2-pyrazoline-3-carboxaldehyde
(17) 5-(p-methylaminophenyl)-1-phenyl-2-pyrazoline-3-carboxaldehyde
(18) 5-(p-morpholinosulfonylphenyl)-1-phenyl-2-pyrazoline-3-carboxaldehyde
(19) 1-phenyl-5-(p-piperidinosulfonylphenyl)-2-pyrazoline-3-carboxaldehyde
(20) 1,5-di-p-anisyl-2-pyrazoline-3-carboxaldehyde
(21) 1-p-anisyl-5-phenyl-2-pyrazoline-3-carboxaldehyde
(22) 1-(p-dimethylaminophenyl)-5-phenyl-2-pyrazoline-3-carboxaldehyde
(23) 1-(2-naphthyl)-5-phenyl-2-pyrazoline-3-carboxaldehyde
(24) 5-p-anisyl-1-(2-naphthyl)-2-pyrazoline-3-carboxaldehyde
(25) 1-(p-dimethylsulfamylphenyl)-5-phenyl-2-pyrazoline-3-carboxaldehyde
(26) 1-(m-chlorophenyl)-5-phenyl-2-pyrazoline-3-carboxaldehyde
(27) 1-(m-nitrophenyl)-5-phenyl-2-pyrazoline-3-carboxaldehyde
(28) 1-(1-naphthyl)-5-phenyl-2-pyrazoline-3-carboxaldehyde
(29) 1,5-diphenyl-4-methyl-2-pyrazoline-3-carboxaldehyde
(30) 1-(p-bromophenyl)-5-phenyl-2-pyrazoline-3-carboxaldehyde
(31) 5-isopropyl-1,4,4-trimethyl-2-pyrazoline-3-carboxaldehyde
(32) 4-ethyl-1-methyl-5-propyl-2-pyrazoline-3-carboxaldehyde
(33) 1-methyl-4,5-bis(trifluoromethyl)-2-pyrazoline-3-carboxaldehyde
(34) 1,5,5-trimethyl-2-pyrazoline-3-carboxaldehyde
(35) 1,5-dimethyl-5-trifluoromethyl-2-pyrazoline-3-carboxaldehyde The following examples will described more fully the preparation of the new class of methine dyes prepared from the 1-substituted-2-pyrazoline-3-carboxaldehyde intermediates.

Example IV 5.1 grams of 1-phenyl-2-pyrazoline-3-carboxaldehyde and 5.5 grams of 1,3,3-trimethyl-2-methyleneindoline plus 25 ml. acetic acid were heated at 95–100° C. for 1 hour. The reaction mass was then poured into 100 cc. saturated salt solution. The dyestuff crystallized readily and was filtered and dried. The product dyes "Orlon" and "Acrilan" in a deep blue-violet shade. The dye has the formula:

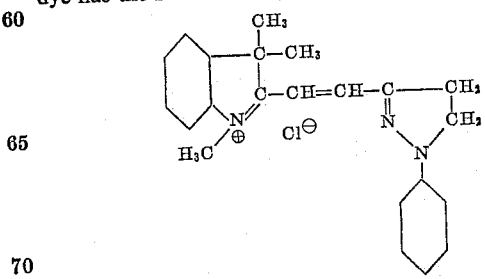

Example V 5.1 grams of 1-phenyl-2-pyrazoline-3-carboxaldehyde, 9.0 grams of 1,2,3,3-tetramethyl-3H-pseudoindolium iodide, 150 ml. ethanol and 5 drops piperidine were heated at reflux temperature for 5 hours and then cooled. The lustrous violet crystals were filtered and recrystallized from methanol, yielding the iodide salt of the product of Example IV.

*Example VI*

5.0 grams of 1,5-diphenyl-2-pyrazoline-3-carboxaldehyde, 3.7 grams of 1,3,3-trimethyl-2-methyleneindoline and 25 cc. acetic acid were heated 1 hour at 95–100° C. The reaction mixture was poured into 100 cc. saturated salt solution. The product crystallized readily and was filtered and dried giving a deep violet dyestuff of the formula:

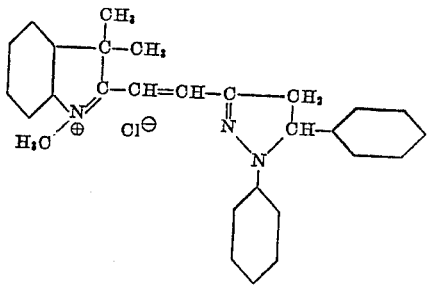

*Example VII*

5.0 grams of 1,5-diphenyl-2-pyrazoline-3-carboxaldehyde, 6.0 grams of 1,2,3,3-tetramethyl-3H-pseudoindolium iodide, 100 cc. ethanol and 5 drops piperidine were heated at reflux temperature for 5 hours. The product crystallized on cooling, was filtered and recrystallized from methanol thus yielding the iodide salt of the product of Example VI.

*Example VIII*

5.3 grams of 5-phenyl-1-p-tolyl-2-pyrazoline-3-carboxaldehyde, 3.7 grams of 1,3,3-trimethyl-2-methyleneindoline and 25 cc. acetic acid were heated at 95–100° C. for 1 hour. The reaction mass was poured into 200 cc. of 15% salt solution. The product crystallized in a few minutes and was filtered and dried. It dyes "Orlon" and "Acrilan" a deep blue-violet shade. It has the formula:

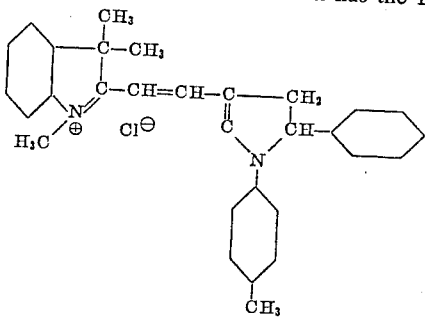

*Example IX*

5.3 grams of 5-phenyl-1-p-tolyl-2-pyrazoline-3-carboxaldehyde, 6.0 grams of 1,2,3,3-tetramethyl-3H-pseudoindolium iodide, 100 ml. ethanol and 5 drops piperidine were heated at reflux temperature for 5 hours. The product crystallized on cooling and was filtered and recrystallized from methanol, yielding the iodide salt of the product of Example VIII.

*Example X*

100 grams of "Orlon 42" cloth were dyed in a dyebath containing a mixture of 0.75 gram of the methine dye of Example IV, 0.75 gram dextrin, 0.3 gram sodium acetate, 1.0 gram 28% aqueous acetic acid in 100 cc. water for 1 hour at the boil. The material was removed, rinsed and dried. It was dyed in a blue-violet shade having good light and wash fastness.

Similar dyeings, employing the dyes of Examples VI and VIII, resulted in the production of deep violet and deep blue-violet shades respectively.

*Example XI*

100 grams of "Acrilan" cloth were dyed in a dyebath which contained a mixture of 0.75 gram of the dye of Example IV, 0.75 gram dextrin, 5.0 grams ammonium acetate, 0.5 gram dispersing agent prepared by condensing 1 mole nonyldiphenol with 15 moles ethylene oxide in 100 cc. water for 1 hour at the boil. The cloth was dyed in a brilliant blue-violet shade having good light and wash fastness.

Similar dyeings, employing the dyes of Examples VI and VIII, resulted in the production of deep violet and deep blue-violet shades respectively.

*Example XII*

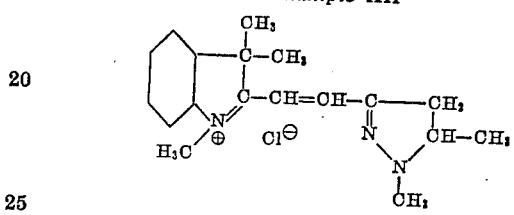

5 grams of 1,5-dimethyl-2-pyrazoline-3-carboxaldehyde and 7 grams of 1,3,3-trimethyl-2-methylene indoline and 25 mm. of acetic acid were heated at 95–100° C. for 1 hour. The reaction mass was then diluted into 100 cc. of saturated salt solution. The dyestuff crystallized readily and was filtered and dried. The resulting dyestuff dyes "Acrilan" and "Orlon" in a deep blue-violet shade.

*Example XIII*

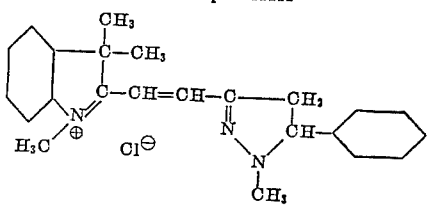

7.5 grams of 1-methyl-5-phenyl-2-pyrazoline-3-carboxaldehyde and 7 grams of 1,3,3-trimethyl-2-methylene indoline and 25 cc. of acetic acid were heated for 1 hour at a temperature of 95–100° C. The reaction mixture was poured into 100 cc. of saturated salt solution. The product crystallized out readily and was filtered followed by drying. The product dyes "Orlon" and "Acrilan" in a deep blue-violet shade.

All of the foregoing dyes, in addition to being useful for dyeing synthetic fibers, are also useful as photographic sensitizers.

By the term "acid radical" as characterized by X in the formulas of the appended claims, it is to be clearly understood that such acid radical includes the various specific anions disclosed herein and all obvious equivalents thereof.

This application is a continuation-in-part of my application Serial No. 843,038 filed on September 29, 1959, now U.S. Patent 3,013,015.

I claim:

1. A methine dye of the follow formula:

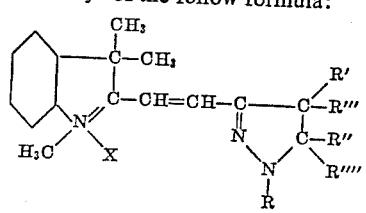

wherein R represents a member selected from the class consisting of alkyl of 1 to 4 carbon atoms, phenyl and naphthyl radicals, R', R", R''' and R'''' represent members selected from the class consisting of hydrogen, alkyl of 1 to 4 carbon atoms, phenyl and naphthyl radicals and X represents an acid radical.

2. A methine dye of the following formula:

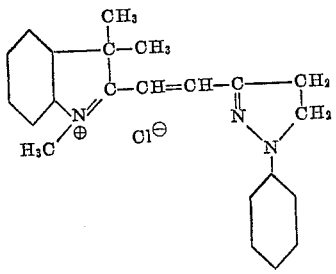

3. A methine dye of the following formula:

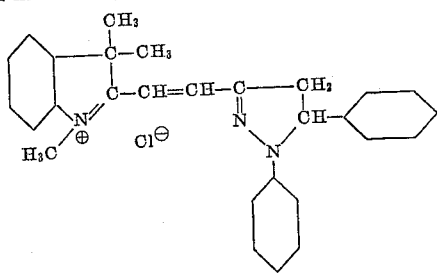

4. A methine dye of the following formula:

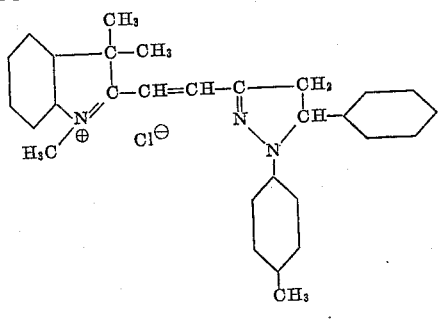

5. A methine dye of the following formula:

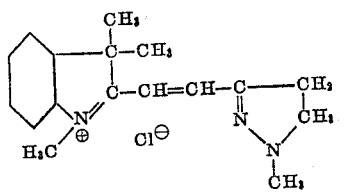

6. A methine dye of the following formula:

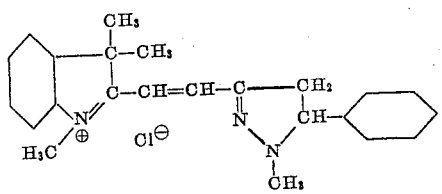

References Cited in the file of this patent
FOREIGN PATENTS

| | | |
|---|---|---|
| 366,964 | Great Britain | Feb. 10, 1932 |
| 797,144 | Great Britain | June 25, 1958 |
| 811,876 | Great Britain | Apr. 15, 1959 |
| 519,406 | Italy | Mar. 14, 1955 |